United States Patent [19]

McCready et al.

[11] 4,269,699
[45] May 26, 1981

[54] BIOADSORPTION ALTERATION OF IRON SULFIDE SURFACES

[75] Inventors: Ronald G. L. McCready, Lethbridge; Richard D. Coleman, Orleans; Charles E. Capes, Ottawa; Alan G. Kempton; Nayera A. M. Moneib, both of Waterloo, all of Canada

[73] Assignee: Canadian Patents & Dev. Ltd., Ottawa, Canada

[21] Appl. No.: 87,698

[22] Filed: Oct. 23, 1979

[51] Int. Cl.³ ............................................. B03B 1/00
[52] U.S. Cl. ................................. 75/101 R; 209/5; 209/46; 209/166; 44/15 R; 435/262
[58] Field of Search .................. 209/9, 5, 166, 167, 209/3, 4, 45, 46, 49; 75/101, 121, 2

[56] References Cited

U.S. PATENT DOCUMENTS

| | | | |
|---|---|---|---|
| 2,829,964 | 4/1958 | Zimmerley | 75/121 X |
| 3,305,353 | 2/1967 | Duncan | 75/121 X |
| 3,796,308 | 3/1974 | McIlhinney | 209/9 |

OTHER PUBLICATIONS

920669, Chem. Abst., Microbiol. Desulf. of Pyritic Coal, Asha et al., 1977.
92067r, Chem. Abst., Microbiol. Desulf. of Coal, Dugan et al., 1978.
177762e, Chem. Abst., Land Use Limitators for Utilization of Bact. Removal from Coal, Roffman, 1979.
207049x, Microbiol. Coal Desulf., Chem. Abst., Grudeu et al., 1979.

Primary Examiner—Robert Halper
Attorney, Agent, or Firm—Alan A. Thomson

[57] ABSTRACT

The sulfide surfaces of finely-divided impure iron sulfide-containing minerals such as pyritic ores or coals are rendered hydrophilic by the adsorption of conditioned, inorganic sulfide-oxidizing bacteria. This adsorption of conditioned bacteria occurs in a short time to render the surfaces hydrophilic and allows these altered sulfide particles to be separated from hydrophobic solids by flotation, oil-agglomeration or the like. This bioadsorption process has particular applicability to pyritic coal beneficiation.

17 Claims, 1 Drawing Figure

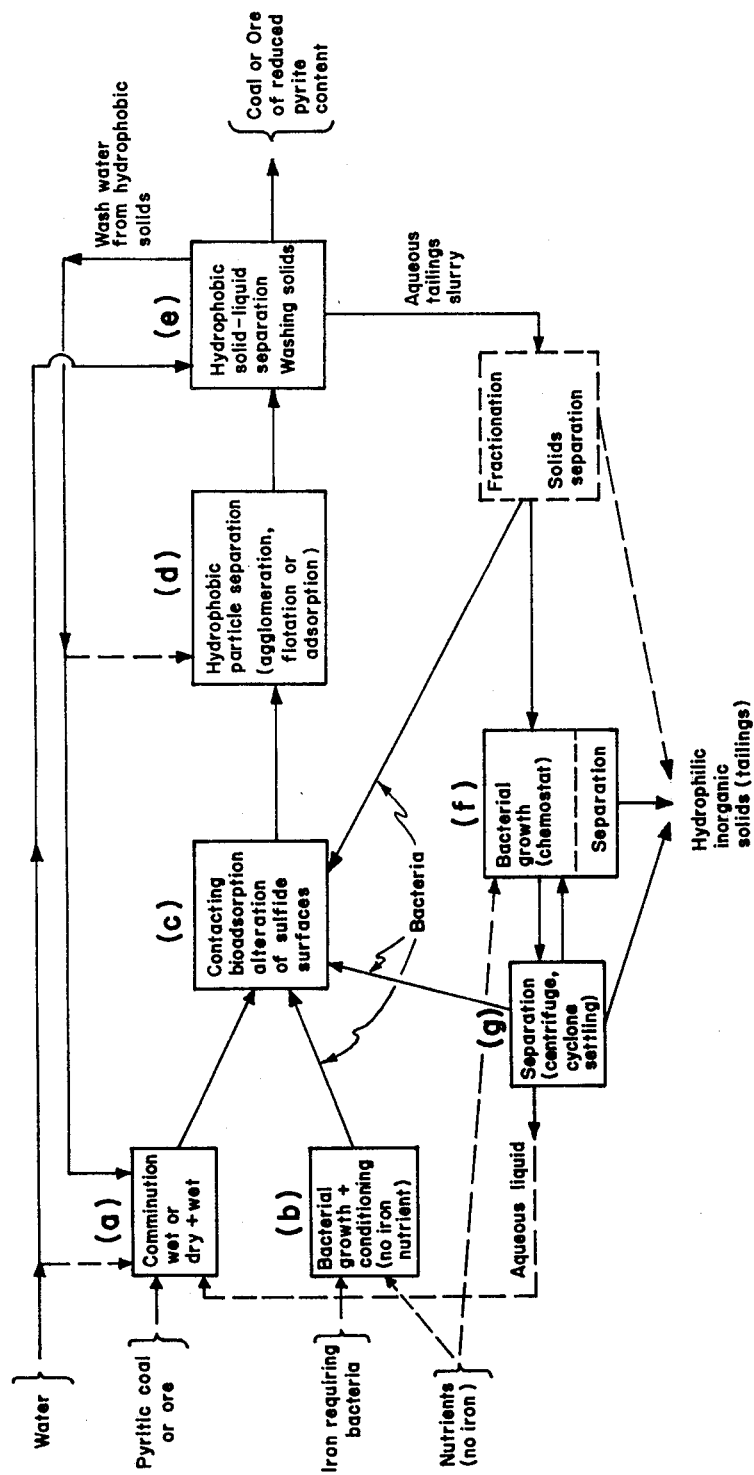

BIOADSORPTION ALTERATION OF IRON SULFIDE SURFACES

FIELD OF THE INVENTION

This invention deals with the alteration of sulfide surfaces in impure metal sulfide minerals, e.g. pyritic ores or coals, to render these surfaces hydrophilic. Conditioned bacteria are caused to become adsorbed and alter the sulfide surfaces in a short contacting time. The hydrophilic sulfides can be separated by an appropriate particle separation operation.

DESCRIPTION OF THE PRIOR ART

Bacterial oxidation and leaching of pyritic ores and coals, and other sulfide ores or tailings has been well described in the literature. The time required for bacterial oxidative leaching of sulfides has been reduced to within about 3 to 15 days under optimized conditions. In some of the best results noted to date, 5-6 days were required to remove about 80% of the pyrite from coal by bacterial treatment. The sulfur removal was accomplished by oxidation and dissolution, usually to form sulfate. Unfortunately, the bacterial oxidation of pyrite is a self-limiting first-order reaction, probably due to the precipitation of $Fe(OH)_3$, which progressively inhibits intimate contact between the microorganisms and the surface of the sulfide mineral.

Bacterial oxidation of high-sulfur coal is not likely to be a practical process because it is too slow and requires a high ratio of bacteria to coal.

In U.S. Pat. No. 3,796,308, McIlhinney et al, Mar. 12, 1974, bacterial oxidation of finely divided sulfide surfaces was carried out until the surfaces were hydrophilic, and then a particle separation step removed hydrophobic from hydrophilic solids. Conditions and complete iron-containing nutrient, favoring rapid baterial growth, were used. The oxidation times required were stated as within about 12 to 72 hours with the lowest reported time being 19 hours in Example 8. Others have recognized that there is a lag period before even surface oxidation commences in such a bacterial system (e.g. lag period of 1 day is reported in Table II of Tuovinen et al, in Biotechnology and Bioengineering, Vol. XIII, pp. 517-527, 1971). It was expected that such bacterial action would require at least about 6-24 hours to commence and often longer before any effect would be evident. While these times were considerably shorter than the times required for oxidation-and-dissolution, still further decrease in treatment times (and hold-up volumes) would be advantageous.

We consider it would be desirable to selectively render the sulfide surfaces adequately hydrophilic for separation, more quickly than has been achieved with bacterial oxidation. It would be desirable to continue to use bacteria for this purpose in view of the low cost of these treating materials.

SUMMARY OF THE INVENTION

We have now found it possible to modify or condition the bacteria so that they will become selectively adsorbed and alter the sulfide surfaces in a relatively short time and cause these surfaces to become effectively hydrophilic. Preliminary microscopic studies have shown such adsorption.

Before contacting the finely-divided mixture to be treated, the bacteria are conditioned in assimilable-iron-deficient media (or recycle media) where there is a lack of iron in a dissolved form readily assimilable by the bacteria. When in this conditioned or recycled state, we have found that these bacteria quickly become adsorbed and alter iron sulfide-containing surfaces and render these surfaces sufficiently hydrophilic that a good separation from hydrophobic material can be achieved. This bioadsorption alteration occurs more rapidly than oxidation to soluble or hydrophilic form. When not in this conditioned or recycled state, insufficient adsorption occurs to bestow adequate hydrophilic properties in these short times. Fewer bacteria or less bacterial suspension has been found to be necessary in this bioadsorption process compared to that required in the prior surface oxidation or leaching processes involving enzymatic reactions.

This invention includes a process for reducing the sulfur content of impure iron sulfide-containing minerals which include hydrophobic components comprising:

(a) subdividing the impure minerals until iron sulfide-containing surfaces are released from non-sulfide hydrophobic solids;

(b) conditioning or maintaining selected bacteria in an aqueous medium deficient in soluble iron nutrient, the bacteria thereby being in condition to be rapidly adsorbed on iron sulfide surfaces; the bacteria requiring iron for growth and being selected from the Thiobacillus and Ferrobacillus groups, and from recycled said bacteria;

(c) contacting the subdivided mineral solids from (a) with the bacteria from (b) in an aqueous medium for a short time sufficient for adsorption of said bacteria on iron sulfide-containing surfaces but insufficient for significant enzymatic oxidation of said surfaces;

(d) separating the hydrophobic non-sulfide particles, from the hydrophilic sulfide+bacterial coated particles; and (e) recovering at least the hydrophobic solids.

The selected bacteria may be conditioned by washing with, or transfer to, a substantially nutrient-iron-free medium, or by allowing the readily assimilable iron to become depleted in the medium. Recycled bacteria in the absence of added iron nutrient have been found most effective. When in this conditioned or recycled state, as soon as iron-containing surfaces become accessible, these bacteria have been found to become rapidly adsorbed on these surfaces, and effectively alter the surfaces to hydrophilic form. These solids with this hydrophilic bacterial layer behave as lyophilic materials and less-lyophilic or hydrophobic solids can be readily separated from the system, e.g. by agglomeration, flotation or adsorption techniques.

DESCRIPTION OF DRAWING

The attached drawing is a schematic flow-sheet of a preferred process according to the invention.

DETAILED DESCRIPTION AND PREFERRED EMBODIMENTS

Various iron sulfide-containing or pyritic minerals, ores or coals may be beneficiated according to this process. Low grade high sulfur coals are particularly suitable but other minerals which can be treated include pyritic copper ores (chalcopyrites, bornite, etc.), pyritic nickel sulfide ores, pyritic zinc sulfide or lead sulfide ores. Mine tailings and other mineral mixtures can be processed, whenever hydrophobic solids along with iron sulfides are present.

The bacteria can be any species from the Thiobacillus and Ferrobacillus groups, the only requirement being that the species must need a source of iron as a terminal electron acceptor. The most suitable species include strains of *Thiobacillus ferrooxidans* or mixtures of *T. ferrooxidans* and other thiobacilli. Preferred strains have been isolated from exposed occurrences of sulfide ores or tailings.

Unexpectedly, we have found that the selected bacteria used did not become inactivated by oil or other reagents added to aid the step (d) separation. The strains used in the examples were found to remain active and could be recycled with advantage. With bacterial recycle it is possible to eliminate most of the added chemical nutrients previously required to maintain bacterial inoculum. The highest pyrite rejections were obtained with recycled bacteria—see Table 5 below.

The pH during this conditioning step (b) is usually the same as for bacterial growth, i.e. within pH about 2 to 4. This pH also is suitable for the contacting step (c) but the pH may range up closer to neutral, e.g. 2–7 in step (c) where this does not prove detrimental for the particular feed used. In step (d) the pH may be raised if it aids in the separation, e.g. to within about pH 4 to 8 for oil agglomeration. The bacteria have been found to survive such conditions, with the pH being lowered again after the separation.

The subdivided solids in the form of an aqueous slurry, are contacted with the conditioned bacteria in any suitable mixing or contact vessel or zone. The solids content of slurry is preferably from about 20 to 50% by wt. The bacteria are normally added as an aqueous suspension containing residual growth medium. The amount of conditioned bacterial suspension added to render the iron sulfide-containing solid surfaces hydrophilic can vary considerably but only sufficient cells are needed to adsorb on and alter these surfaces. This amount is less than that required for rapid bacterial oxidation as in U.S. Pat. No. 3,796,308 discussed above. The time required for this contacting-adsorption step (c) will normally be less than about 2 hours and usually less than 1 hour. Times as low as 10–15 minutes have been found satisfactory in most cases.

When adequate adsorption has been achieved to bestow hydrophilic properties allowing separation, the mixture is subjected to a particle separation in step (d). The particle separation step can be any one or a combination of the separation steps described in U.S. Pat. No. 3,796,308. An agglomeration by a water-immiscible bridging liquid (usually hydrocarbon) with controlled agitation and mixing is usually preferred. The solids content may need adjustment for best results in the agglomeration. Preferably the slurry solids content is within about 2 to 40% wt for (d). Hydrophobic solids will be agglomerated with the bridging liquid and the agglomerates can be removed, e.g. by screening, hydrocyclones, etc. The tailings suspension can be partially recycled directly if desired. The bacteria-sulfide tailings or portion thereof can also be fed to a bacterial growth zone where nutrients (other than iron) may be added and conditions maintained to allow growth of the desired bacteria. The bacteria can derive iron from the surfaces on which they are adsorbed and multiply to a limited extent. The overall system will remain deficient in soluble nutrient iron.

Optionally in the presence of added nutrient iron, much of the bacteria will desorb from the iron sulfide-containing surfaces and growth will occur largely separated from the entrained solids (tailings). These sulfide tailings solids (or portion thereof) may then be separated (as by settling and decanting) and discarded or subjected to further separate processing for recovery of other values. This bacterial suspension remaining would then be allowed to become deficient in soluble iron nutrient before recycle.

Usually the hydrophobic solids in the agglomerate are the desired product, e.g. coal of reduced pyrite content. The bridging liquid may be recovered, e.g. by extraction or distillation, and recycled if desired. In the case of coal and hydrocarbon bridging liquid, the hydrocarbon liquid can be left with the coal for added calorific value if desired. The coal agglomerates are easily handled, stored and transported.

The bacteria recovered from the tailings, after further growth and multiplication (if desired), and solids separation, can be recycled to the solids contacting stage (c), in the substantial absence of added soluble iron nutrient. When recycled bacteria are free of added iron nutrient, they can be fed directly to the slurry contact zone. When steady state operation has been achieved, all of the required bacteria can be supplied in this manner (see Examples 3 and 4). Alternatively, a proportion (usually minor) of bacteria from a iron-deficient synthetic medium can be utilized continuously. In order to minimize the expense of added synthetic nutrients it will usually be preferable to recycle bacteria and aqueous medium, using nutrients derived from the recycle and ore feed as much as possible.

For optimum separations, and shortest hold-up time in contacting step (c), we have found the following conditions preferable in step (c):
bacterial species—*Thiobacillus ferrooxidans*
amount of bacteria added to slurry—$6-9 \times 10^{10}$ cells/g solids
slurry solids content—~40% wt.
pH—about 2.3–2.5
temperature—about 24°–28° C.

Good surface adsorption and subsequent separations have been achieved under such conditions with contact times as low as about 10–15 minutes. Shorter contact times are possible.

Referring to the drawing, a preferred process is shown in flowsheet form. Pyritic coal or ore is fed to a comminution stage (a) where subdivision is carried out until sulfide particles are released from hydrophobic or coal solids. At least the final grinding stage will be done wet (in an aqueous medium which may include recycled wash water). The selected iron-requiring bacteria are conditioned at (b) in an iron-deficient medium. The wet comminuted solids and bacterial suspension are contacted at (c) until bioadsorption and alteration of iron sulfide-containing surfaces is achieved. The mixture is then fed to particle separation step (d) where the more lyophobic or hydrophobic particles are, e.g. agglomerated, floated or adsorbed onto a hydrophobic retentive collecting surface. A separation-washing-recovery stage is carried out at (e) and coal or ore of reduced pyrite content recovered. These recovered solids are usually washed and the wash water may be recycled to the comminution stage. It has been found that excess bacteria in the tailings slurry still have the capacity to quickly adsorb on the pyrite surfaces and preferably part or all of the tailings bacteria are recycled directly or indirectly to stage (c) as shown (benefit in terms of percent pyrite removed has been observed when this was done). Preferably an aqueous slurry of tailings bacteria is fed to a bacterial growth stage (f) (which may be a chemostat) where the bacteria can grow and multiply. Nutrients (except added iron) may be supplied as necessary. Some separation of solids may precede or take place at this stage. A final separation of inorganic solids for discard will usually take place at (g) as in centrifuge or cyclone means. When the recycled bacteria are in condition for rapid adsorption, they will be fed from (g) to the bioadsorption stage (c). In a continuous operation, no fresh bacteria need be added to (b) but some fresh iron-free nutrient will normally be added to bacterial growth stage (f). Preferably there will be both pH and solids content adjustments from steps (c) to (d).

EXAMPLES

The following laboratory-scale tests and results are illustrative and not limiting.

Bacterial Inoculum—Growth and Conditioning

A strain of *T. ferrooxidans* was isolated by one of us (McCready) from abandoned pyritic uranium mine tailings near Elliot Lake, Ontario, and found to have an optimum growth pH near 2.3. This strain required iron and grew well in Tuovinen and Kelly's medium (O. H. Tuovinen and D. P. Kelly, "Archives Mikrobiologie", Vol. 88, 1973, p. 285). Stock cultures were prepared in 250 ml Erlenmeyer flasks, each containing 100 ml of medium, and grown at 30° C. on a gyratory shaker for 72 h. Stock cultures remained active at 4° C. for at least one week. For mass culture, a 10 liter carboy containing 8 liters of medium was inoculated with 400 ml of stock culture and incubated at room temperature for 72 h. under forced aeration and stirring. To obtain a cell mass relatively free of solid contaminants, the precipitate was allowed to settle, and the supernatant was collected by siphoning and centrifuged at 20,000×g for 20 min. to sediment the bacterial cells. The cells were washed twice in sterile modified Tuovinen and Kelly's $FeSO_4$-free medium at pH 2.3, then resuspended in the same iron-free medium. Cell numbers in the final suspension were determined by a direct count under a phase contrast microscope. This strain was selected for effectiveness in our bioadsorption process.

Iron Sulfide-Containing Feed

Two typical ores, representative of those found in the Minto area of New Brunswick, Canada, were chosen for testing. Two samples were used, one coarse ground and one fine ball milled, primarily to show the effect of particle size distribution on pyrite removal. Their characteristics are given on Table 1.

TABLE 1

| Properties* of coals used | coal no. 1 (ground) | coal no. 2 (ball milled) |
|---|---|---|
| Ash | 19.2 | 22.2 |
| Total sulfur | 6.5 | 10.1 |
| Oxidized S (sulfate) | 0.3 | 0.2 |
| Pyritic sulfur | 5.1 | 8.0 |
| Organic sulfur | 1.4 | 1.5 |
| Particle size distribution** | 4(%) > 100μ | 1(%) > 8μ |
| | 11 > 60μ | 10 > 6μ |
| | 20 > ]40μ | 30 > 5μ |
| | 29 > 30μ | 89 > 3μ |
| | 43 > 20μ | 95 > 2μ |
| | 69 > 10μ | |
| | 88 5μ5μ | |
| | 98 > 2μ | |

*All values expressed as percent by weight, dry basis
**Particle sizes > 45μ were analyzed by wet screen analysis, while those < 45μ were analyzed with a Coulter Counter Stepwise details of a typical conditioning, bioadsorption, and particle separation (in this case agglomeration) process were as follows. Briefly, 100 g of coal ore slurry containing 35 g of coal was added to 300–400 ml of iron-free bacterial medium in a 1 liter flask. The desired amount of conditioned cell suspension (inoculum) was added, and then the flask was shaken well and incubated on a gyratory shaker for the stipulated time. Agglomeration with hydrocarbon liquid, e.g. Varsol (Trademark-ESSO) was carried out in a blender according to the procedure described in Capes et al (Canadian Mining and Metallurgical Bulletin, 1973, p. 88) to separate the coal.

Pyritic sulfur content of coal was determined by the procedure of Van Hees and Early (Fuel, Vol. 38, p. 425) except that the iron was determined by atomic absorption.

EXAMPLE 1

Tests were carried out as stated to indicate the effects of two particle sizes of the feed ore nos. 1 and 2 as described above, three bacteria inoculum amounts {to step (c)}, and three contact times {in step (c)}. The results are summarized in Table 2.

It is clear that pyrite rejection increased as the particle size of the feed ore decreased. The bioadsorption step is seen to increase the pyrite rejection significantly compared to the agglomeration alone. No advantage was evident in using excess bacteria (even less bacteria than tested would be effective in this adsorption technique).

TABLE 2

Pyrite Removal by Agglomeration from Different Coals Under Variable Condition of Inoculum Size and Bioadsorption Contact Time in Step(c)

| | coal no. 1 (coarse) | | coal no. 2 (fine) | |
|---|---|---|---|---|
| Treatment | % pyrite | % rejection | % pyrite | % rejection |
| untreated feed | 5.05 | — | 8.01 | — |
| agglomeration alone (d) | 4.2 | 16.8 | 4.56 | 43.1 |
| Variable inoculum size (contact time constant at 30 min.) | | | | |
| $5.32 \times 10^{11}$ cells/g coal ore (6 l of medium used) | 2.90 | 42.6 | 2.48 | 69.9 |
| $2.66 \times 10^{11}$ cells/g coal ore (3 l of medium used) | 2.80 | 44.6 | 2.50 | 68.9 |
| $1.33 \times 10^{11}$ cells/g coal ore (1.5 l of medium used) | 3.40 | 32.7 | 2.24 | 72.0 |
| Variable contact time (inoculum size constant at $2.66 \times 10^{11}$ | | | | |

TABLE 2-continued

Pyrite Removal by Agglomeration from Different Coals Under Variable Condition of Inoculum Size and Bioadsorption Contact Time in Step(c)

| Treatment | coal no. 1 (coarse) | | coal no. 2 (fine) | |
|---|---|---|---|---|
| | % pyrite | % rejection | % pyrite | % rejection |
| cells/g of coal ore) | | | | |
| 60 min. | 2.64 | 47.7 | 2.27 | 71.7 |
| 30 min. | 2.80 | 44.6 | 2.50 | 68.9 |
| 15 min. | 3.41 | 32.5 | 3.12 | 61.1 |

EXAMPLE 2

Experiments conducted with the ball-milled coal ore no. 2 were repeated and the aqueous bacteria-plus-tailings slurry recovered was used to treat subsequent batches of coal ore in steps (c) to (e) again (see flowsheet where tailings slurry is fed directly to step (c)). This same process was repeated with a third batch of coal ore no. 2 feed. The results are given in Table 3, from which it is evident that the bacterial system did not lose effectiveness when reused at least twice.

The results seem to indicate a trend to increased efficiency with bacteria recycle. This inherent "recycle-conditioning" can obviate (at least in part) the need for separate growth and re-conditioning as in steps (f), (g) and (b) in the flowsheet. With the amount of initial inoculum reduced still further (to $6.65 \times 10^{10}$ cells/g coal ore) satisfactory results were obtained on recycle even with just 15 min. of contact time.

TABLE 3

Recycling Bacterial Inoculum to Remove Pyrite Under Variable Conditions of Inoculum Size and Bioadsorption Contact Time in Step (c)

| | Pyrite content (per cent) | | | |
|---|---|---|---|---|
| Treatment in Step (c) | initial | fresh inoculum | inoculum recycled once | inoculum recycled twice |
| Variable inoculum size (contact time constant at 30 min) | | | | |
| $5.32 \times 10^{11}$ cells/g coal ore | 8.01 | 2.48 | 1.72 | 1.66 |
| $2.66 \times 10^{11}$ cells/g coal ore | 8.01 | 2.50 | 2.13 | 1.56 |
| $1.32 \times 10^{11}$ cells/g coal ore | 8.01 | 2.24 | 2.04 | 2.07 |
| $6.65 \times 10^{10}$ cells/g coal ore | 8.01 | 2.00 | 1.84 | 1.62 |
| Variable contact time (inoculum size constant at $2.66 \times 10^{11}$ cells/g of coal) | | | | |
| 60 min | 8.01 | 2.27 | 1.56 | 1.66 |
| 30 min | 8.01 | 2.50 | 2.13 | 1.56 |
| 15 min | 8.01 | 3.12 | 2.47 | 1.88 |

EXAMPLE 3

Further results from additional tests as outlined above, are summarized in Table 4. With an initial inoculum of $6.65 \times 10^{10}$ cells/g of coal ore, and full recycle of the bacteria-plus-tailings slurry through six successive batches of coal ore no. 2 feed, for 15 min. contact times, no decrease in efficiency was observed.

It is considered that the initial conditioned bacteria added may be able to multiply when they come into contact with the pyrite surfaces but at least part of the daughter cells quickly become iron-deficient and are rapidly adsorbed when they in turn contact fresh sulfide surfaces (on recycle). Whatever actually occurs, this "recycle-conditioning" in the absence of added iron nutrient, is able to substitute for conditioning (b), on recycle of bacteria. The hydrocarbon liquid used for agglomeration of the coal in (d) had no detrimental effect on the recycled bacteria.

TABLE 4

Initial inoculum of $6.65 \times 10^{10}$ cells/g of coal ore recycled five times at 15 min intervals. Pyrite content after bioadsorption (c) and spherical agglomeration (d).

| Treatment | % Pyrite | % Rejection |
|---|---|---|
| none | 8.01 | — |
| agglomeration alone (d) | 4.56 | 43.07 |
| fresh inoculum | 2.64 | 67.04 |
| 1st recycled inoculum | 2.34 | 70.79 |
| 2nd recycled inoculum | 1.48 | 81.52 |
| 3rd recycled inoculum | 1.86 | 76.78 |
| 4th recycled inoculum | 1.98 | 75.28 |
| 5th recycled inoculum | 2.14 | 73.28 |

EXAMPLE 4

The tailings from Example 3 (containing bacteria that had been recycled 5 times plus the total pyrite and ash rejected) were placed in a 10 liter vessel and brought up to 8 liters with iron-free medium of pH 2.3. This system was aerated and stirred at room temperature for two weeks, after which the formation of yellow precipitate (ferric sulfate) and a decrease in pH (e.g. from about 3 to 2.5) indicate that the *T. ferrooxidans* was growing on the waste pyrite. Portions (400 ml) from this growth vessel were used to treat consecutive batches of another sample of ball-milled coal no. 2 (100 g of slurry). As shown in Table 5, the bacteria grown on the tailings can be used in the bioadsorption step. When followed by spherical agglomeration with Varsol as much as 93–94% of the pyrite was eliminated from successive batches of coal.

TABLE 5

Pyrite content after bioadsorption* and spherical agglomeration using *Thiobacillus ferrooxidans* inoculum grown on waste pyrite.

| Treatment | % Pyrite | % Rejection |
|---|---|---|
| none | 6.01 | — |
| agglomeration alone | 2.54 | 58.36 |
| fresh inoculum | 3.56 | 41.64 |
| 1st recycled inoculum | 0.34 | 94.42 |
| 2nd recycled inoculum | 0.72 | 88.20 |
| 3rd recycled inoculum | 0.40 | 93.44 |
| 4th recycled inoculum | 0.43 | 92.95 |

*Step (c) contact time 15 min.

This recycle is believed to provide for many bacterial cells being iron-deficient and in condition to be rapidly adsorbed because of being unable to reach iron-containing surfaces which have become blocked by other bacteria. This iron-containing surface inaccessability may be partly due to $Fe(OH)_3$ build-up similarly to prior art bacterial oxidation as mentioned above. In any case, results indicate that assimilable iron becomes inaccessible and many cells become iron-deficient, leading to effective adsorption and rendering of fresh sulfide surfaces hydrophilic on recycle.

We claim:

1. A process for reducing the sulfur content of impure iron sulfide-containing minerals which include hydrophobic components comprising:
   (a) subdividing the impure minerals until iron sulfide-containing surfaces are released from non-sulfide hydrophobic solids;
   (b) conditioning or maintaining bacteria requiring iron for growth and being selected from the Thiobacillus and Ferrobacillus groups, and from recycled said bacteria, in an aqueous medium deficient in iron nutrient, to deplete bacterial iron reserves, thereby causing the bacteria to be in condition to be rapidly adsorbed on fresh iron sulfide surfaces in order to restore depleted nutrient iron;
   (c) contacting the subdivided mineral solids from (a) with the bacteria from (b) in an aqueous medium for a short time sufficient for adsorption of said bacteria on iron sulfide-containing surfaces but insufficient for significant enzymatic oxidation of said surfaces;
   (d) separating the hydrophobic non-sulfide particles from the sulfide-containing particles rendered hydrophilic by adsorption of said bacteria; and
   (e) recovering at least the hydrophobic solids.

2. The process of claim 1 wherein the mineral comprises a coal or coal-containing ore.

3. The process of claim 1 wherein the mineral comprises a pyritic metal ore.

4. The process of claims 1 or 2 wherein the bacteria is selected from *Thiobacillus ferrooxidans, Thiobacillus thiooxidans, Ferrobacillus ferrooxidans,* and mixtures thereof.

5. The process of claims 1 or 2 wherein the time of contacting in step (c) is within about 10 minutes to 1 hour.

6. The process of claims 1 or 2 wherein a hydrophilic sulfide + bacteria mixture is recovered in step (e), and at least part of the bacteria recycled.

7. The process of claims 1 or 2 wherein a bacteria-rich material is recovered in step (e), incubated in the absence of added iron nutrient, and bacteria therefrom recycled to step (c).

8. The process of claims 1 or 2 wherein a bacterial fraction is recovered in step (e) and recycled directly to step (c).

9. The process of claims 1 or 2 wherein the selected bacteria are utilized in step (c) in the form of a mixture of (i) a major proportion of recycled bacteria from step (d) which has been maintained iron-deficient, and
   (ii) a minor proportion of fresh iron-deficient bacteria.

10. The process of claims 1 or 2 wherein sulfide solids are recovered in step (e) for further processing.

11. The process of claims 1 or 2 wherein the separation in step (d) is an agglomeration with hydrophobic liquid.

12. The process of claims 1 or 2 wherein the separation in step (d) is an agglomeration with hydrocarbon liquid which is recovered and recycled.

13. The process of claims 1 or 2 wherein the separation in step (d) is a froth flotation of the non-sulfide solids.

14. The process of claims 1 or 2 wherein the separation in step (d) is a preferential adsorption of hydrophobic solids onto a retentive hydrophobic surface.

15. The process of claims 1 or 2 wherein aqueous phase or wash water from step (d) or (e) is recycled to step (a) for wet grinding.

16. The process of claims 1 or 2 wherein any aqueous phase containing bacterial nutrients is recycled.

17. The process of claims 1 or 2 wherein hydrophilic solids are separated for discard after step (e).

* * * * *